US010028184B2

United States Patent
Huang et al.

(10) Patent No.: US 10,028,184 B2
(45) Date of Patent: *Jul. 17, 2018

(54) USER EQUIPMENT AND METHODS FOR MEASUREMENT OF REFERENCE SIGNAL RECEIVED QUALITY

(71) Applicant: Intel IP Corporation, Santa Clara, CA (US)

(72) Inventors: Rui Huang, Beijing (CN); Yang Tang, Pleasanton, CA (US); Yujian Zhang, Beijing (CN)

(73) Assignee: Intel IP Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/639,547

(22) Filed: Jun. 30, 2017

(65) Prior Publication Data
US 2017/0311215 A1    Oct. 26, 2017

Related U.S. Application Data

(63) Continuation of application No. 14/571,053, filed on Dec. 15, 2014, now Pat. No. 9,713,049.
(Continued)

(51) Int. Cl.
*H04L 12/50* (2006.01)
*H04W 36/00* (2009.01)

(52) U.S. Cl.
CPC .............................. *H04W 36/0094* (2013.01)

(58) Field of Classification Search
CPC ....................................................... H04L 12/50
(Continued)

(56) References Cited

U.S. PATENT DOCUMENTS 8,116,211 B2    2/2012  Ishii et al.
9,713,049 B2 *  7/2017  Huang .............. H04W 36/0094
(Continued)

FOREIGN PATENT DOCUMENTS

JP       2017516341 A     6/2017
KR    1020130117833 A    10/2013
(Continued)

OTHER PUBLICATIONS

"3GPP Draft", R4-142345, 3rd Generation Partnership Project (3GPP), Mobile Competence Centre ; 650, Route Deslucioles ; F-06921 Sophia-Antipolis Cedex; France vol. RAN WG4, no. San Jose del Cabo,Mexico, [Online] Retrieved from the Internet<http://www.3gpp.org/ftp/tsg_ran/WG4_Radio/TSGR4_70Bis/Docs/>, (Apr. 5, 2014).
(Continued)

*Primary Examiner* — Dang Ton
(74) *Attorney, Agent, or Firm* — Schwegman Lundberg & Woessner, P.A.

(57) ABSTRACT

Embodiments of UE and methods for measurement of Reference Signal Received Quality (RSRQ) are generally described herein. The UE may be configured to determine an RSRQ of a serving cell and an RSRQ of a target cell based on an indicated RSRQ measurement type. The measurement type may be received as part of a measurement configuration Information Element (IE) that indicates a first or second RSRQ measurement type. For the first RSRQ measurement type, the RSRQ may be determined based on a Received Signal Strength Indicator (RSSI) over common reference signals (CRS). For the second RSRQ measurement type, the RSRQ may be determined based on an RSSI that is based on a received power of one or more Orthogonal Frequency Division Multiplexing (OFDM) symbols received at the UE.

21 Claims, 7 Drawing Sheets

Related U.S. Application Data

(60) Provisional application No. 61/985,390, filed on Apr. 28, 2014.

(58) Field of Classification Search
USPC .......................................................... 370/329
See application file for complete search history.

(56) References Cited

U.S. PATENT DOCUMENTS

| | | | |
|---|---|---|---|
| 2011/0199923 | A1 | 8/2011 | Persson et al. |
| 2012/0038521 | A1 | 2/2012 | Zhu et al. |
| 2013/0272170 | A1 | 10/2013 | Chatterjee et al. |
| 2013/0308481 | A1 | 11/2013 | Kazmi et al. |
| 2015/0312817 | A1 | 10/2015 | Huang et al. |
| 2016/0119907 | A1 | 4/2016 | Seo et al. |
| 2017/0126357 | A1* | 5/2017 | Dalsgaard ............. H04L 1/0026 |

FOREIGN PATENT DOCUMENTS

| | | |
|---|---|---|
| KR | 1020140010030 A | 1/2014 |
| KR | 1020160127061 A | 11/2016 |
| KR | 101834928 B1 | 2/2018 |
| WO | WO-2012096296 A1 | 7/2012 |
| WO | WO-2013169904 A1 | 11/2013 |
| WO | WO-2014014328 A1 | 1/2014 |
| WO | WO-2015167700 A1 | 11/2015 |
| WO | WO-2017200228AI | 11/2017 |

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 12)", 3GPP TS 36.331 V12.1.0, (Mar. 2014), 356.
"U.S. Appl. No. 14/571,053, Non Final Office Action dated Nov. 21, 2016", 6 pgs.
"U.S. Appl. No. 14/571,053, Notice of Allowability dated Mar. 29, 2017", 2 pgs.
"U.S. Appl. No. 14/571,053, Notice of Allowance dated Mar. 15, 2017", 5 pgs.
"U.S. Appl. No. 14/571,053, Response filed Feb. 21, 2017 to Non Final Office Action dated Nov. 21, 2016", 12 pgs.
"Discussion on RSRQ definition", 3GPP Draft; R4-134995, 3rd Generation Partnership Project (3GPP), Mobile Competence Centre ; 650, Route Deslucioles ; F-06921 Sophia-Antipolis Cedex; France vol. RAN WG4, [Online] Retrieved from the Internet : <http://www.3gpp.org/ftp/tsg_ran/WG4_Radio/TSGR4_68Bis/Docs/>, (Sep. 30, 2013).
"European Application Serial No. 15785380.5, Extended European Search Report dated Oct. 2, 2017", 15 pgs.
"European Application Serial No. 17185490.4, Extended European Search Report dated Oct. 2, 2017", 17 pgs.
"Further discussion on RSRQ definition", 3GPP Draft; R4-140612, 3rd Generation Partnership Project (3GPP), Mobile Competence Centre ; 650, Route Deslucioles ; F-06921 Sophia-Antipolis Cedex; France, [Online] Retrieved from the Internet : <http://www.3gpp.org/ftp/Meetings_3GPP_SYNC/RAN/RAN4/Docs/>, (Feb. 9, 2014).
"International Application Serial No. PCT/US2015/022399, International Preliminary Report on Patentability dated Nov. 10, 2016", 9 pgs.
"International Application Serial No. PCT/US2015/022399, International Search Report dated Jun. 30, 2015", 9 pgs.
"International Application Serial No. PCT/US2015/022399, Written Opinion dated Jun. 30, 2015", 7 pgs.
"Korean Application Serial No. 10-2016-7026200, Notice of Preliminary Rejection dated Jul. 17, 2017", W/ English Translation, 17 pgs.
"Korean Application Serial No. 10-2016-7026200, Response filed Sep. 18, 2017 to Notice of Preliminary Rejection dated Jul. 17, 2017", (W/ English Claims), 23 pgs.
"LS on defining the new RSRQ measurements definition", TSG RAN WG: 3GPP Draft; RI-141915(R4-142526), $3^{RD}$ Generation Partnership Project (3GPP), Mobile Competence Centre ; 650, Route Deslucioles ; F-06921 Sophia-Antipolis Cedex ; France vol. RAN WG1, no. Seoul [Online] Retrieved from the Internet : <http://www.3gpp.org/ftp/tsg_ran/WGI_RLI/TSGRI_77/Docs>, (Apr. 21, 2014).
Intel, et al., "Way forward on RSRQ definition", 3GPP Draft; R4-135673, 3rd Generation Partnership Project (3GPP), Mobile Competence Centre ; 650, Route Deslucioles ; F-06921 Sophia-Antipolis Cedex; France vol. RAN WG4, no. Riga, [Online] Retrieved from the Internet : <http://www.3gpp.org/ftp/tsg_ran/WG4_Radio/TSGR4_68Bis/Docs/>, (Oct. 11, 2013).
"Further discussion on new RSRQ definition", Intel Corporation, , 3GPP TSG-RAN WG4 Meeting #70bis R4-141570 [Online] Retrieved from the Internet : <http://www.3gpp.org/ftp/tsg_ran/WG4_Radio/TSGR4_70Bis/Docs/R4-141570Lzip>, (Apr. 9, 2014), 1-5.
"Japanese Application Serial No. 2016-558091, Office Action dated Nov. 21, 2017", w/English Translation, 11 pgs.
"Korean Application Serial No. 10-2017-7018484, Notice of Preliminary Rejection dated Nov. 24, 2017", With English Translation, 5 pgs.
"Korean Application Serial No. 10-2017-7018484, Response filed Jan. 24, 2018 to Notice of Preliminary Rejection dated Nov. 24, 2017", (W/ English Claims), 12 pgs.
"LS Out on introducing the new RSRQ measurements definition", 3GPP TSG RAN WG4 Meeting #70bis R4-142527 [Online] Retrieved from the Internet : <URL:http://www.3gpp.org/ftp/tsg_ran/WG4_Radio/TSGR4_70Bis/Docs/R4-142527.zip>, (Apr. 9, 2014), 1.
"Way Forward on RSSI measurement for RSRQ", Qualcomm Incorporated, Verizon Wireless, 3GPP TSG-RAN WG4 Meeting #70Bis R4-142345, [Online] Retrieved from the Internet : <http://www.3gpp.org/ftp/tsg_ran/WG4_Radio/TSGR4_70Bis/Docs/R4-142345.zip>, (Apr. 9, 2014), 3.
"Japanese Application Serial No. 2016-558091, Response Filed Feb. 21, 2018 to Office Action dated Nov. 21, 2017", (W English Claims), 23 pgs.

* cited by examiner

USER EQUIPMENT AND METHODS FOR MEASUREMENT OF REFERENCE SIGNAL RECEIVED QUALITY

PRIORITY CLAIM

This application is a continuation of Ser. No. 14/571,053, filed Dec. 15, 2014, which claims priority to U.S. Provisional Patent Application Ser. No. 61/985,390, filed Apr. 28, 2014, which are incorporated herein by reference in their entirety.

TECHNICAL FIELD

Embodiments pertain to wireless communications. Some embodiments relate to cellular communication networks including LTE networks. Some embodiments relate to signal measurements including Reference Signal Received Quality (RSRQ). Some embodiments relate to handovers or handoffs between cells in cellular networks.

BACKGROUND

A mobile device operating in a cellular network may handoff between different cells of the network for any number of performance reasons. As an example, it may be beneficial to the mobile device and to the overall network for the mobile device to handoff to a target cell that offers a more reliable link than a serving cell. Various signal measurements may be taken at the mobile device and may be compared for different cells as part of that handoff decision. In some cases, base stations operating in those cells may have different capabilities or configurations. Accordingly, inconsistencies in signal measurement techniques for different base stations may produce undesired results. Therefore, there is a general need for systems and methods to determine link performance for different base stations.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
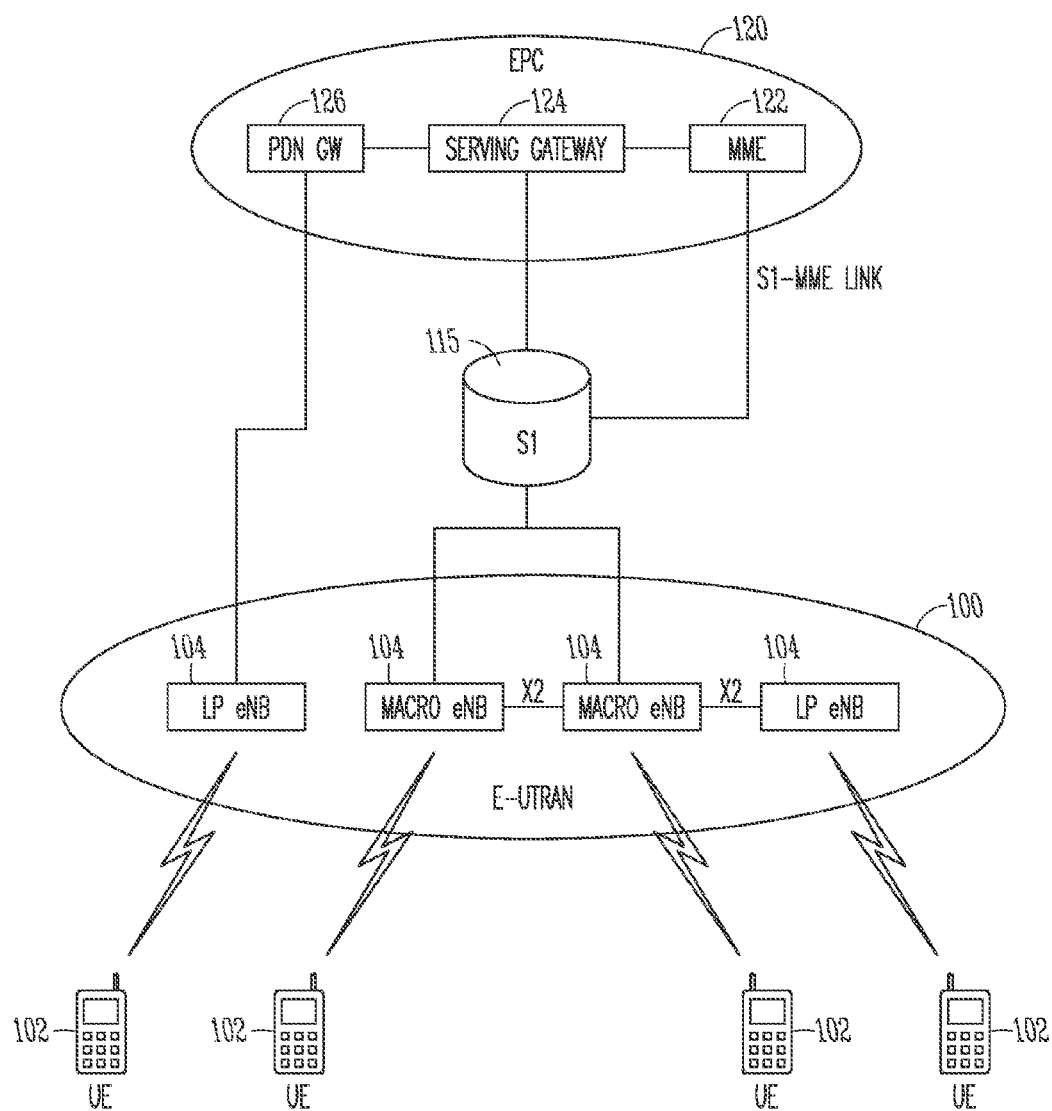
FIG. 1 is a functional diagram of a 3 GPP network in accordance with some embodiments.

FIG. 1 is a functional diagram of a 3GPP network in accordance with some embodiments. The network comprises a radio access network (RAN) (e.g., as depicted, the E-UTRAN or evolved universal terrestrial radio access network) 100 and the core network 120 (e.g., shown as an evolved packet core (EPC)) coupled together through an S1 interface 115. For convenience and brevity sake, only a portion of the core network 120, as well as the RAN 100, is shown.

The core network 120 includes mobility management entity (MME) 122, serving gateway (serving GW) 124, and packet data network gateway (PDN GW) 126. The RAN 100 includes Evolved Node-B's (eNBs) 104 (which may operate as base stations) for communicating with User Equipment (UE) 102. The eNBs 104 may include macro eNBs and low power (LP) eNBs. In accordance with some embodiments, the UE 102 may determine a Reference Signal Received Quality (RSRQ) of a serving cell and an RSRQ of a target cell based on an indicated RSRQ measurement type, which may be included as part of a measurement configuration Information Element (IE) received at the UE 102 from the eNB 104. These embodiments will be described in more detail below.

The MME 122 is similar in function to the control plane of legacy Serving GPRS Support Nodes (SGSN). The MME 122 manages mobility aspects in access such as gateway selection and tracking area list management. The serving GW 124 terminates the interface toward the RAN 100, and routes data packets between the RAN 100 and the core network 120. In addition, it may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes. The PDN GW 126 terminates an SGi interface toward the packet data network (PDN). The PDN GW 126 routes data packets between the EPC 120 and the external PDN, and may be a key node for policy enforcement and charging data collection. It may also provide an anchor point for mobility with non-LTE accesses. The external PDN can be any kind of IP network, as well as an IP Multimedia Subsystem (IMS) domain. The PDN GW 126 and the serving GW 124 may be implemented in one physical node or separated physical nodes.

The eNBs 104 (macro and micro) terminate the air interface protocol and may be the first point of contact for a UE 102. In some embodiments, an eNB 104 may fulfill various logical functions for the RAN 100 including but not limited to RNC (radio network controller functions) such as radio bearer management, uplink and downlink dynamic radio resource management and data packet scheduling, and mobility management. In accordance with embodiments, UEs 102 may be configured to communicate OFDM communication signals with an eNB 104 over a multicarrier communication channel in accordance with an OFDMA communication technique. The OFDM signals may comprise a plurality of orthogonal subcarriers.

The S1 interface 115 is the interface that separates the RAN 100 and the EPC 120. It is split into two parts: the S1-U, which carries traffic data between the eNBs 104 and the serving GW 124, and the S1-MME, which is a signaling interface between the eNBs 104 and the MME 122. The X2 interface is the interface between eNBs 104. The X2 interface comprises two parts, the X2-C and X2-U. The X2-C is the control plane interface between the eNBs 104, while the X2-U is the user plane interface between the eNBs 104.

With cellular networks, LP cells are typically used to extend coverage to indoor areas where outdoor signals do not reach well, or to add network capacity in areas with very dense phone usage, such as train stations. As used herein, the term low power (LP) eNB refers to any suitable relatively low power eNB for implementing a narrower cell (narrower than a macro cell) such as a femtocell, a picocell, or a micro cell. Femtocell eNBs are typically provided by a mobile network operator to its residential or enterprise customers. A femtocell is typically the size of a residential gateway or smaller and generally connects to the user's broadband line. Once plugged in, the femtocell connects to the mobile operator's mobile network and provides extra coverage in a range of typically 30 to 50 meters for residential femtocells. Thus, a LP eNB might be a femtocell eNB since it is coupled through the PDN GW 126. Similarly, a picocell is a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus, LP eNB may be implemented with a picocell eNB since it is coupled to a macro eNB via an X2 interface. Picocell eNBs or other LP eNBs may incorporate some or all functionality of a macro eNB. In some cases, this may be referred to as an access point base station or enterprise femtocell.

In some embodiments, a downlink resource grid may be used for downlink transmissions from an eNB 104 to a UE 102, while uplink transmission from the UE 102 to the eNB 104 may utilize similar techniques. The grid may be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid correspond to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements and in the frequency domain and may represent the smallest quanta of resources that currently can be allocated. There are several different physical downlink channels that are conveyed using such resource blocks. With particular relevance to this disclosure, two of these physical downlink channels are the physical downlink shared channel and the physical down link control channel.

The physical downlink shared channel (PDSCH) carries user data and higher-layer signaling to a UE 102 (FIG. 1). As an example, the higher-layer signaling may include Radio Resource Control (RRC) signaling. The physical downlink control channel (PDCCH) carries information about the transport format and resource allocations related to the PDSCH channel, among other things. It also informs the UE 102 about the transport format, resource allocation, and H-ARQ information related to the uplink shared channel. Typically, downlink scheduling (assigning control and shared channel resource blocks to UEs 102 within a cell) is performed at the eNB 104 based on channel quality information fed back from the UEs 102 to the eNB 104, and then the downlink resource assignment information is sent to a UE 102 on the control channel (PDCCH) used for (assigned to) the UE 102.

The PDCCH uses CCEs (control channel elements) to convey the control information. Before being mapped to resource elements, the PDCCH complex-valued symbols are first organized into quadruplets, which are then permuted using a sub-block inter-leaver for rate matching. Each PDCCH is transmitted using one or more of these control channel elements (CCEs), where each CCE corresponds to nine sets of four physical resource elements known as resource element groups (REGs). Four QPSK symbols are mapped to each REG. The PDCCH can be transmitted using one or more CCEs, depending on the size of DCI and the channel condition. There may be four or more different PDCCH formats defined in LTE with different numbers of CCEs (e.g., aggregation level, L=1, 2, 4, or 8).

Figure 2:
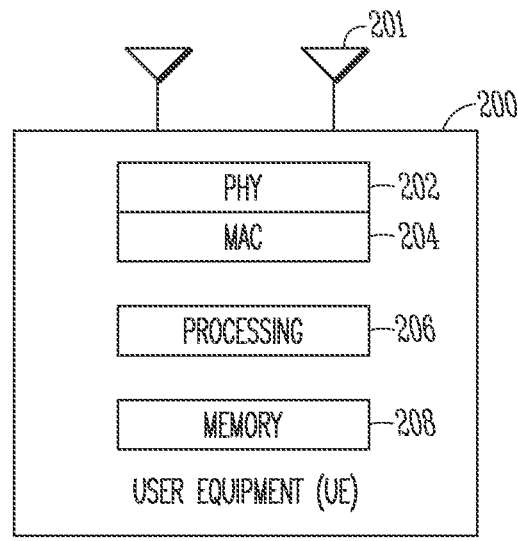
FIG. 2 is a functional diagram of a User Equipment (UE) in accordance with some embodiments.
Figure 3:
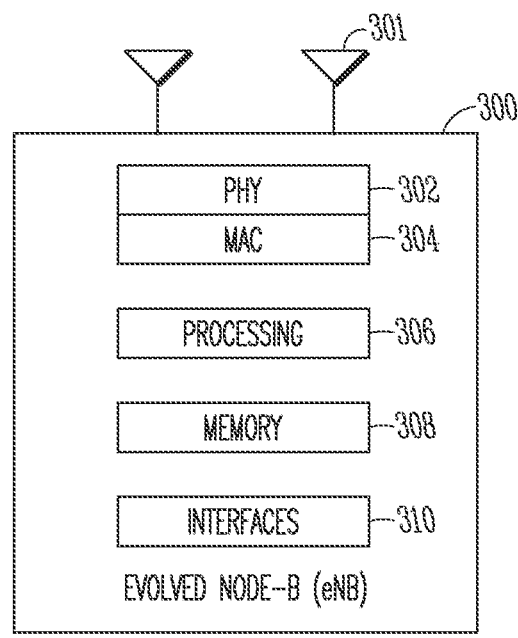
FIG. 3 is a functional diagram of an Evolved Node-B (eNB) in accordance with some embodiments.

FIG. 2 is a functional diagram of a User Equipment (UE) in accordance with some embodiments. FIG. 3 is a functional diagram of an Evolved Node-B (eNB) in accordance with some embodiments. It should be noted that in some embodiments, the eNB 300 may be a stationary non-mobile device. The UE 200 may be a UE 102 as depicted in FIG. 1, while the eNB 300 may be an eNB 104 as depicted in FIG. 1. The UE 200 may include physical layer circuitry 202 for transmitting and receiving signals to and from the eNB 300, other eNBs, other UEs or other devices using one or more antennas 201, while the eNB 300 may include physical layer circuitry 302 for transmitting and receiving signals to and from the UE 200, other eNBs, other UEs or other devices using one or more antennas 301. The UE 200 may also include medium access control layer (MAC) circuitry 204 for controlling access to the wireless medium, while the eNB 300 may also include medium access control layer (MAC) circuitry 304 for controlling access to the wireless medium. The UE 200 may also include processing circuitry 206 and memory 208 arranged to perform the operations described herein, and the eNB 300 may also include processing circuitry 306 and memory 308 arranged to perform the operations described herein. The eNB 300 may also include one or more interfaces 310, which may enable communication with other components, including other eNBs 104 (FIG. 1), components in the EPC 120 (FIG. 1) or other network components. In addition, the interfaces 310 may enable communication with other components that may not be shown in FIG. 1, including components external to the network. The interfaces 310 may be wired or wireless or a combination thereof.

The antennas 201, 301 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 201, 301 may be effectively separated to take advantage of spatial diversity and the different channel characteristics that may result.

In some embodiments, mobile devices or other devices described herein may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or other device that may receive and/or transmit information wirelessly. In some embodiments, the mobile device or other device can be a UE or an eNB configured to operate in accordance with 3GPP standards. In some embodiments, the mobile device or other device may be configured to operate according to other protocols or standards, including IEEE 802.11 or other IEEE standards, although the scope of the embodiments is not limited in this respect. In some embodiments, the mobile device or other device may include one or more of a keyboard, a display, a non-volatile memory port, multiple antennas, a graphics processor, an application processor, speakers, and other mobile device elements. The display may be an LCD screen including a touch screen.

Although the UE 200 and eNB 300 are each illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

In accordance with some embodiments, the UE 102 may be configured to determine an RSRQ of a serving cell and an RSRQ of a target cell based on an indicated RSRQ measurement type. The measurement type may be received as part of a measurement configuration Information Element (IE) that indicates a first or second RSRQ measurement type. Embodiments are not limited to the first and second RSRQ measurement types, however, as any number of RSRQ measurement types may be used in some cases. For the first RSRQ measurement type, the RSRQ may be determined based on a Received Signal Strength Indicator (RSSI) over common reference signals (CRS). For the second RSRQ measurement type, the RSRQ may be determined based on an RSSI that is based on a received power of one or more Orthogonal Frequency Division Multiplexing (OFDM) symbols received at the UE. These embodiments are described in more detail below.

Figure 4:
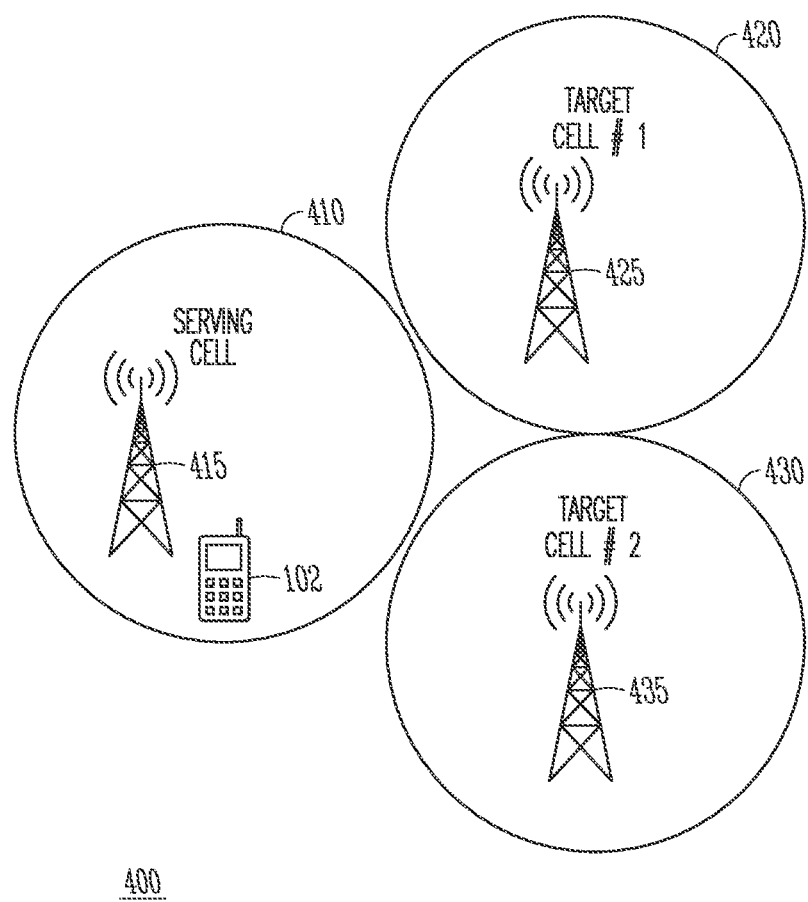
FIG. 4 illustrates an example of a scenario in which a UE may report measurements for multiple target cells in accordance with some embodiments.

FIG. 4 illustrates an example of a scenario in which a UE may report measurements for multiple target cells in accordance with some embodiments. It should be noted that embodiments are not limited to the number of cells shown in the example scenario 400 and are not limited to the configuration shown in the example scenario 400. The UE 102 may be communicating with the serving eNB (S-eNB) 415 while operating in the serving cell 410. A first target cell 420 and second target cell 430 may be supported by the target eNBs (T-eNBs) 425 and 435, respectively. The target cells 420 may be configured differently than the serving cell 410 and/or from each other in some cases. As an example, some cells of a 3GPP network may be configured to support 3GPP standards up to a particular version or release, such as "Release 11", while other cells may be configured to also support versions or releases beyond "Release 11". Accordingly, some techniques or operations may be specified differently in different versions or releases of such standards.

Figure 5:
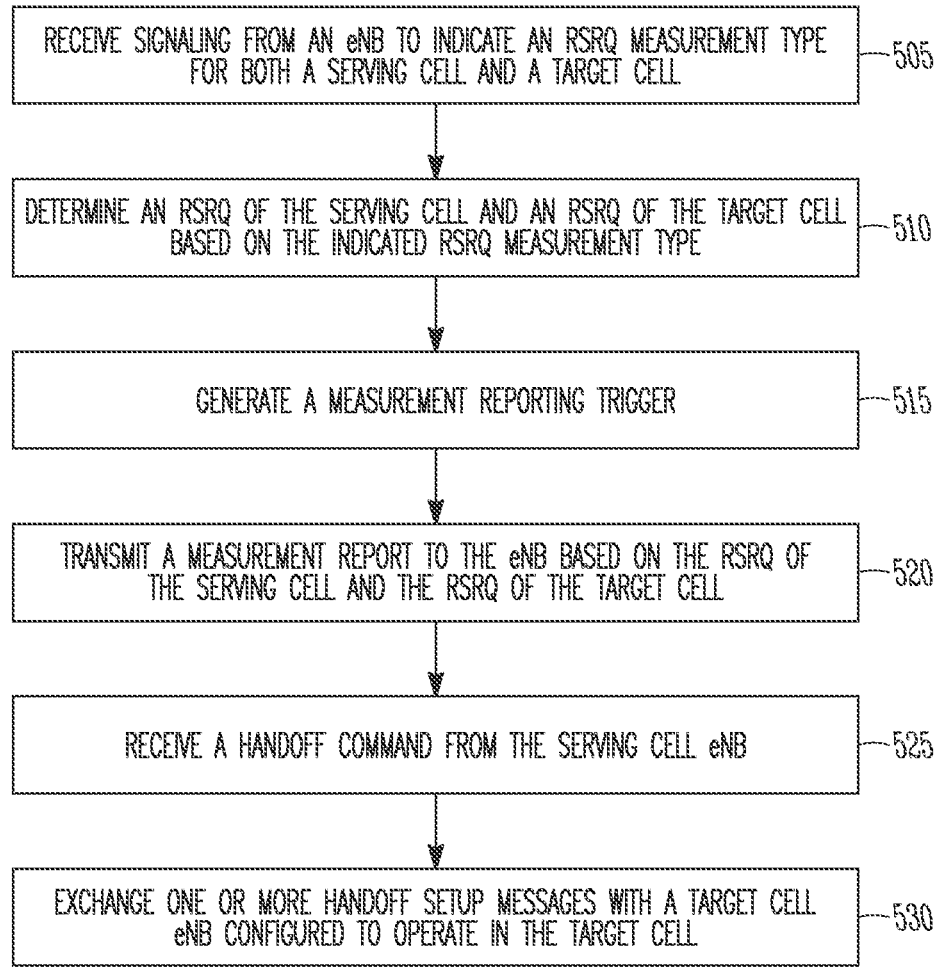
FIG. 5 illustrates the operation of a method of measurement reporting at a UE in accordance with some embodiments.

FIG. 5 illustrates the operation of a method of measurement reporting at a UE in accordance with some embodiments. It is important to note that embodiments of the method 500 may include additional or even fewer operations or processes in comparison to what is illustrated in FIG. 5. In addition, embodiments of the method 500 are not necessarily limited to the chronological order that is shown in FIG. 5. In describing the method 500, reference may be made to FIGS. 1-4 and 6-7, although it is understood that the method 500 may be practiced with any other suitable systems, interfaces and components. For example, reference may be made to the scenario 400 in FIG. 4 described earlier for illustrative purposes, but the techniques and operations of the method 500 are not so limited.

In addition, while the method 500 and other methods described herein may refer to eNBs 104 or UEs 102 operating in accordance with 3GPP or other standards, embodiments of those methods are not limited to just those eNBs 104 or UEs 102 and may also be performed by other mobile devices, such as a Wi-Fi access point (AP) or user station (STA). Moreover, the method 500 and other methods described herein may be practiced by wireless devices configured to operate in other suitable types of wireless communication systems, including systems configured to operate according to various IEEE standards such as IEEE 802.11.

At operation 505 of the method 500, the UE 102 may receive signaling from an eNB 104 to indicate an RSRQ measurement type for both a serving cell and a target cell. At operation 510, an RSRQ of the serving cell and an RSRQ of the target cell may be determined based on the indicated RSRQ measurement type. In some embodiments, the eNB 104 may be a serving eNB 104 associated with the serving cell, but is not so limited. In addition, embodiments are not limited to a single target cell in these operations or other operations. As an example, the RSRQ measurement type may refer to multiple target cells in some cases.

The RSRQ measurement type may indicate either a first or a second RSRQ measurement type that is to be used for both the serving cell and the target cell. Although not limited as such, the first RSRQ measurement type may be for a legacy operation and the second RSRQ measurement type may be for a non-legacy operation in some embodiments. That is, the RSRQ measurement type indicator may specify either a legacy RSRQ determination or a non-legacy RSRQ determination for use in RSRQ determination and/or generation of a measurement reporting trigger based on the determined RSRQ.

As an example, the legacy operation may refer to versions or releases of 3GPP standards up to and including "Release 11" as described earlier, while the non-legacy operation may refer to versions or releases beyond "Release 11". In this case, for the first RSRQ measurement type, the RSRQ may be determined based on a Received Signal Strength Indicator (RSSI) over common reference signals (CRS). For the second RSRQ measurement type, the RSRQ may be determined based on an RSSI that is based on a received power of one or more OFDM symbols received at the UE 102.

Some examples of RSSI determination for the second RSRQ measurement type will be described, but it is understood that the examples are not limiting and other suitable RSSI determination techniques may be used. As an example, the RSSI may include a linear average of received powers in the OFDM symbols. In addition, a sub-frame may include multiple OFDM symbols and the linear average may be performed for at least one of the OFDM symbols in the sub-frame. The linear average may be performed, in some cases, in a measurement bandwidth that occupies at least a portion of a transmission bandwidth for the OFDM symbols.

It is important to note that RSRQ determination according to the different techniques just described may produce results that are quite different for the examples of first and second RSRQ measurement types (or legacy and non-legacy). Failure of the UE 102 to employ the same RSRQ measurement type may result in the link for one of the cells (serving or target) appearing to be better or worse than it actually is. Accordingly, unfavorable handoff decisions may be made based on a comparison of RSRQ measurements that may be considered unfair, biased or skewed. Therefore, communication of the RSRQ measurement type for usage at the UE 102 for RSRQ measurements of the serving cell and the target cell may enable improved handoff performance.

In some embodiments, the signaling received from the eNB 104 may include Radio Resource Control (RRC) signaling that includes a measurement configuration Information Element (IE) that specifies the RSRQ measurement type indicator for both the serving cell and the target cell. These embodiments are not limiting, however, and the RSRQ measurement type may be communicated to the UE 102 in another form of signaling, in another IE or in another message type.

Figure 6:
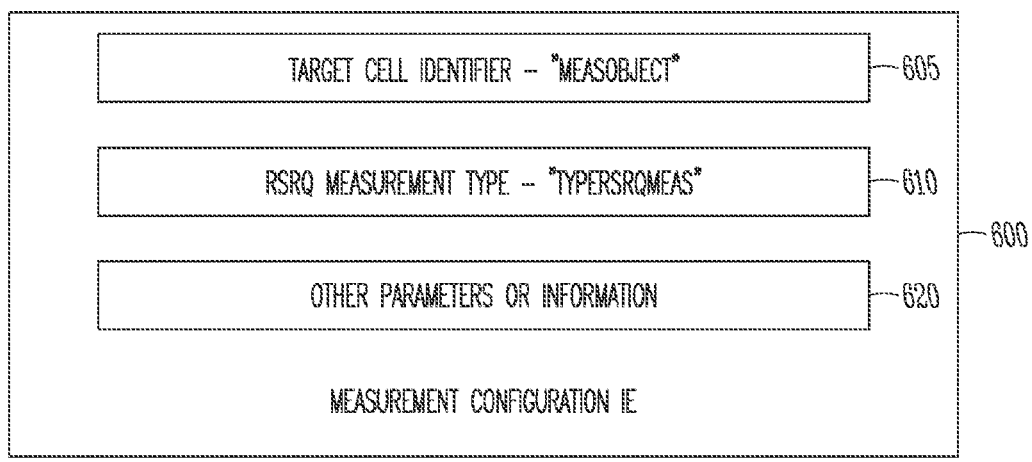
FIG. 6 illustrates an example of a measurement configuration Information Element (IE) in accordance with some embodiments.

FIG. 6 illustrates an example of a measurement configuration Information Element (IE) in accordance with some embodiments. The measurement configuration IE 600 may include a target cell identifier 605, an RSRQ measurement type indicator 610, and other parameters or information 620. It is important to note that some or all of these fields or quantities may be included in the measurement configuration IE 600, and may include other fields or quantities not shown. In addition, the contents of the measurement configuration IE 600 are not limited to the order or presentation shown in the example of FIG. 6.

The RSRQ measurement type 610 may indicate how RSRQ is to be computed for both a serving cell and a target cell that may be specified in the target cell identifier 605. The serving cell may be known in some cases, but may also be specified within the measurement configuration IE 600. The RSRQ measurement type 610 may include information in any suitable format, including one or more bit fields. As an example, predetermined techniques known at the UE 102 may be referenced with a Boolean variable taking on values such as "old/new" or "legacy/non-legacy" or "first/second" or similar. The target cell identifier 605 may also reference the target cell in any suitable manner, including the use of an identification, serial number or index number.

Returning to the method 500, a measurement reporting trigger may be generated at operation 515. A measurement report may be transmitted to the eNB 104 at operation 520. The measurement report may be based on the RSRQ of the serving cell and the RSRQ of the target cell.

In some embodiments, when a difference between the determined RSRQ of the target cell and the determined RSRQ of the serving cell exceeds a predetermined offset, the measurement reporting trigger may be generated. That is, the measurement reporting trigger may be generated based at least partly on a comparison of a measured RSRQ for a serving cell with a measured RSRQ for a target cell. It should be noted that the difference may be an absolute difference or a signed difference between the two RSRQ values. In addition, the measurement reporting trigger may also be generated, in some cases, based on a comparison of one or both of these RSRQ values with one or more thresholds. The measurement report may be transmitted in response to the difference condition or other condition described above. The measurement report may also be transmitted in response to the measurement reporting trigger.

As an example, in 3GPP standards, an A3 event may occur when a difference between the determined RSRQ of the target cell and the determined RSRQ of the serving cell exceeds a predetermined A3 offset. In some embodiments, the predetermined A3 offset may be based at least partly on the indicated RSRQ measurement type. That is, different offset values may be used for the different types, and those values may be predetermined based on analysis, simulation or design in some cases. Accordingly, the measurement reporting trigger may be generated in response to the occurrence of the A3 event. In addition, the measurement report may be transmitted in response to the occurrence of the A3 event or in response to the measurement reporting trigger.

It should be noted that, in some embodiments, the measurement report transmission and/or the measurement reporting trigger generation may be performed in response to a joint or combined occurrence of the A3 event and one or more other events or conditions. For instance, other RSRQ comparisons or other measurements related to signal quality or level at the UE 102 may also be used along with the comparisons for the A3 event.

At operation 525, a handoff command may be received at the UE 102 from the serving cell eNB 104. The handoff command may indicate, suggest or instruct the UE 102 to handoff to the target cell or to another cell. Accordingly, the handoff command may identify the cell or an eNB 104 operating within the cell using any suitable identifier. For example, a base station ID number or similar may be used.

At operation 530, the UE 102 may exchange one or more handoff setup messages with a target cell eNB 104 configured to operate in the target cell. The exchanging of the setup messages may be performed in response to the reception of the handoff command. In addition, the UE 102 may exchange traffic packets with the target cell eNB 104 once the handoff has been made.

Figure 7:
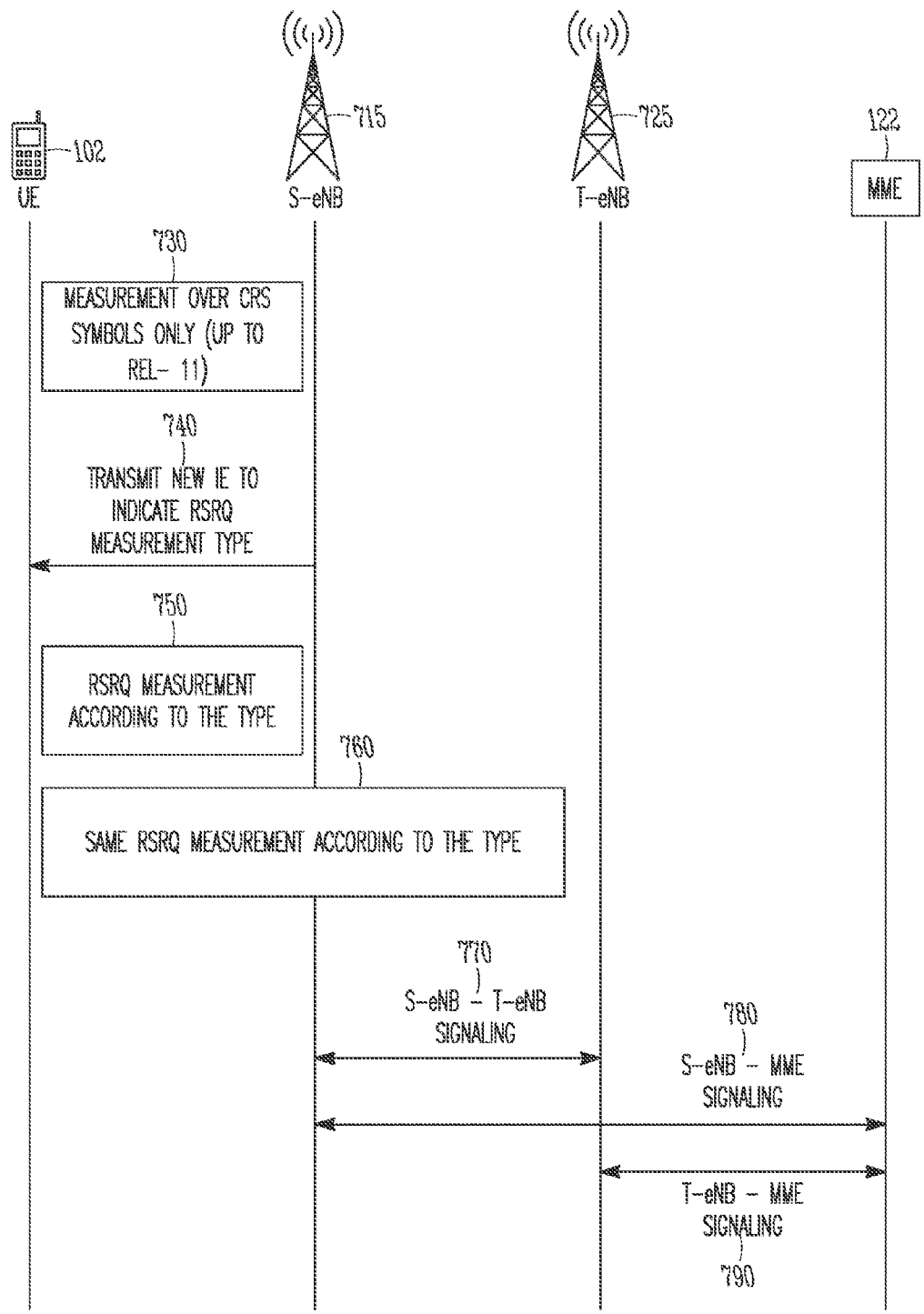
FIG. 7 illustrates an example of RSRQ measurement operations and signaling between a UE and an eNB in accordance with some embodiments.

FIG. 7 illustrates an example of RSRQ measurement operations and signaling between a UE and an eNB in accordance with some embodiments. At operation 730, the UE 102 may perform one or more RSRQ measurements over CRS symbols only. As an example, those RSRQ measurements in 3GPP standards up to "Release 11" may be performed accordingly, although the scope of the embodiments is not limited in this respect.

At operation 740, the S-eNB 715 (serving eNB) may transmit a new IE that may indicate an RSRQ measurement type. This operation may be performed using techniques previously described. For instance, the new IE may be similar to or the same as the measurement configuration IE described earlier. As an example, the RSRQ measurement type may refer to a legacy or non-legacy technique to be used. For instance, the legacy technique may be applicable for versions or releases of 3GPP standards up to "Release 11" while the non-legacy technique may be applicable to subsequent versions or releases of the 3GPP standards, as described earlier.

At operation 750, an RSRQ measurement may be performed at the UE 102 according to the indicated RSRQ measurement type on signals received from the S-eNB 715. At operation 760, an RSRQ measurement may be performed at the UE 102 according to the same indicated RSRQ measurement type on signals received from the T-eNB 725. Accordingly, a comparison of RSRQs for the S-eNB 715 and the T-eNB 725 may be performed at the UE 102. That comparison may be a fair comparison, in some cases, as the same type of RSRQs may be used.

At operation 770, various signaling between the S-eNB 715 and the T-eNB 725 may be performed. In some embodiments, the signaling may be performed over an X2 interface or other interface, which may be included as part of 3GPP or other standards. The signaling may include notifications of which RSRQ measurement type is to be used. At operation 780, various signaling between the S-eNB 715 and the MME 122 may be performed and at operation 790, various signaling between the T-eNB 725 and the MME 122 may be performed. The signaling described at operations 770-790 may be bi-directional between the components, and may include setup information, handoff information, neighbor cell information (such as lists) or any other related information.

Figure 8:
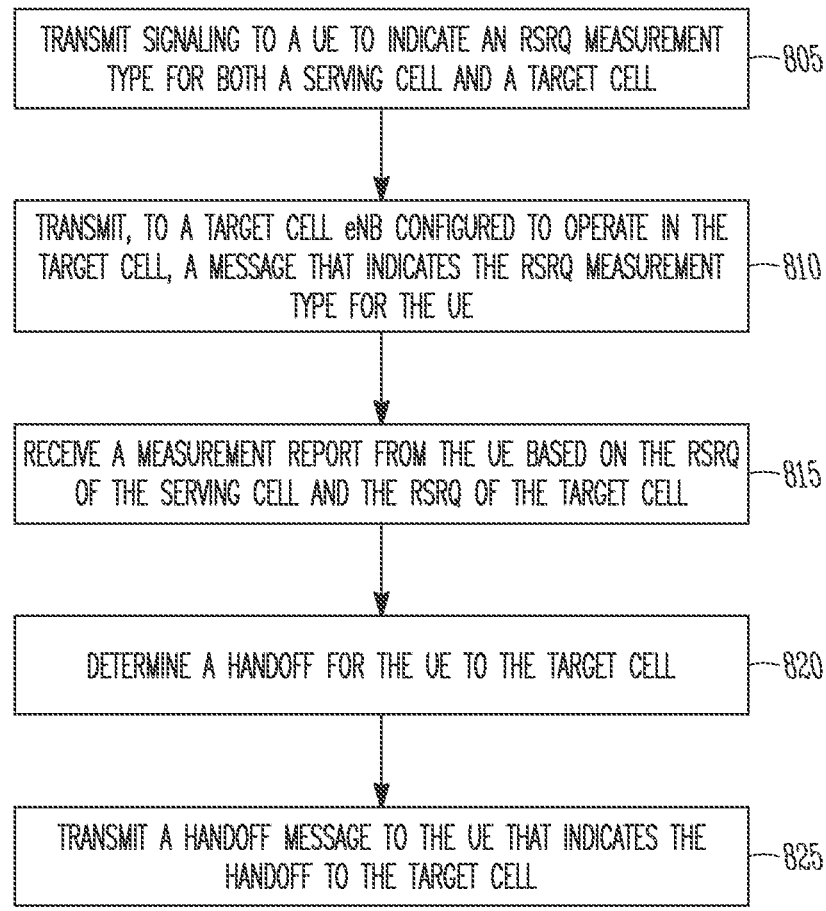
FIG. 8 illustrates the operation of a method of measurement reporting in accordance with some embodiments.

FIG. 8 illustrates the operation of a method of measurement reporting in accordance with some embodiments. As mentioned previously regarding the method 500, embodiments of the method 800 may include additional or even fewer operations or processes in comparison to what is illustrated in FIG. 8 and embodiments of the method 800 are not necessarily limited to the chronological order that is shown in FIG. 8. In describing the method 800, reference may be made to FIGS. 1-7, although it is understood that the method 800 may be practiced with any other suitable systems, interfaces and components. In addition, embodiments of the method 800 may refer to eNBs 104, UEs 102, APs, STAs, other wireless devices, other mobile devices or other devices or components of wireless networks.

It should be noted that previous discussion, techniques, operations and concepts related to the method 500 may be applied to the method 800 in some cases. For instance, signaling or messages described as part of the method 500 may be similar to or the same as corresponding concepts used in the method 800.

At operation 805, the eNB 104 may transmit signaling to a UE 102 to indicate an RSRQ measurement type for both a serving cell and a target cell. As previously described, any suitable signaling may be used, including RRC signaling that may include a measurement configuration Information Element (IE) that specifies the RSRQ measurement type indicator for both the serving cell and the target cell. At operation 810, the eNB 104 may transmit, to a target cell eNB 104 configured to operate in the target cell, a message that indicates the RSRQ measurement type for the UE 102. Such a transmission may be performed over any suitable interface, such as an X2 interface. The message may inform the target cell eNB 104 of RSRQ measurement type is to be used by the UE 102 or in other measurements by other UEs 102.

At operation 815, the eNB 104 may receive a measurement report from the UE 102 based on the RSRQ of the serving cell and the RSRQ of the target cell. As previously described, the measurement report may include RSRQ values for the serving cell and the target cell, and may also include other information. At operation 820, a handoff for the UE 102 to the target cell may be determined, and may be based at least partly on the received measurement report. For instance, if the measured RSRQ of the target cell is higher than the measured RSRQ for the serving cell by a specified margin, a handoff to the target cell may be determined. This example is not limiting, however, as the handoff may be determined using other techniques, including techniques described herein. At operation 825, the eNB 104 may transmit a handoff message to the UE 102 that indicates the handoff to the target cell. As previously described, the handoff message may include such as an identifier of the target cell or a target eNB 104 configured to operate in the target cell.

User Equipment (UE) configured to operate in a 3GPP LTE cellular network is disclosed herein. The UE may comprise hardware processing circuitry configured to receive signaling from an Evolved Node-B (eNB) to indicate either a first or a second Reference Signal Received Quality (RSRQ) measurement type for both a serving cell and a target cell. In some embodiments, the signaling may indicate other RSRQ measurement types in addition to or instead of the first and second RSRQ measurement types. In some embodiments, the RSRQ measurement types may also be for additional target cells. The hardware processing circuitry may be further configured to determine an RSRQ of the serving cell and an RSRQ of the target cell based on the indicated RSRQ measurement type and transmit a measurement report to the eNB based on the RSRQ of the serving cell and the RSRQ of the target cell. For the first RSRQ measurement type, the RSRQ for both the serving cell and the target cell may be determined from a Received Signal Strength Indicator (RSSI) over one or more Orthogonal Frequency Division Multiplexing (OFDM) symbols in which common reference signals (CRS) are included. For the second RSRQ measurement type, the RSRQ may be determined for both the serving cell and the target cell from an RSSI that is based on a received power of one or more Orthogonal Frequency Division Multiplexing (OFDM) symbols received at the UE. In some embodiments, at least one of the OFDM symbols for the determination of the RSRQ for the second RSRQ measurement type may exclude CRS.

In some embodiments, the signaling received from the eNB may include Radio Resource Control (RRC) signaling that includes a measurement configuration Information Element (IE) that specifies the RSRQ measurement type indicator for both the serving cell and the target cell. In some embodiments, the RSSI for the second RSRQ measurement type may include a linear average of received powers in the OFDM symbols. In some embodiments, a measurement sub-frame may include multiple OFDM symbols and the linear average may be performed for at least one of the OFDM symbols in the measurement sub-frame. In some embodiments, the linear average may be performed in a measurement bandwidth that occupies at least a portion of a transmission bandwidth for the OFDM symbols.

In some embodiments, an A3 event may occur when a difference between the determined RSRQ of the target cell and the determined RSRQ of the serving cell exceeds a predetermined A3 offset and the measurement report may be transmitted in response to an occurrence of the A3 event. In some embodiments, the predetermined A3 offset may be based at least partly on the indicated RSRQ measurement type. In some embodiments, the first RSRQ measurement type may be for a legacy operation and the second RSRQ measurement type may be for a non-legacy operation. In some embodiments, the eNB may be a serving cell eNB configured to operate in the serving cell.

The hardware processing circuitry may be further configured to receive a handoff command from the serving cell eNB. The hardware processing circuitry may be further configured to exchange, in response to the reception of the handoff command, one or more handoff setup messages with a target cell eNB configured to operate in the target cell. In some embodiments, the hardware processing circuitry may include one or more transceivers configured to be coupled to one or more antennas. The reception of the signaling from the eNB and the transmission of the measurement report to the eNB may be performed at the one or more antennas.

A method of measurement reporting at a User Equipment (UE) configured to operate in a 3GPP LTE cellular network is also disclosed herein. The method may include receiving, from an Evolved Node-B (eNB), a Reference Signal Received Quality (RSRQ) measurement type indicator that specifies either a legacy RSRQ determination or a non-legacy RSRQ determination for use in generation of a measurement reporting trigger. The method may further include transmitting a measurement report to the eNB in response to the generation of the measurement reporting trigger. The measurement reporting trigger may be generated based at least partly on a comparison of a measured RSRQ for a serving cell with a measured RSRQ for a target cell. The RSRQs for the serving cell and target cell may both be determined according to the RSRQ measurement type indicator. In some embodiments, the legacy RSRQ determination may be based on a Received Signal Strength Indicator (RSSI) over one or more Orthogonal Frequency Division Multiplexing (OFDM) symbols in which common reference signals (CRS) are included and the non-legacy RSRQ determination may be based on an RSSI that is based on a total received power of one or more Orthogonal Frequency Division Multiplexing (OFDM) symbols received at the UE. In some embodiments, the RSSI for the non-legacy RSRQ measurement type may include a linear average of received powers in the OFDM symbols in a measurement bandwidth that occupies at least a portion of a transmission bandwidth for the OFDM symbols. At least one of the OFDM symbols for the non-legacy RSRQ measurement type may exclude CRS.

In some embodiments, the RSRQ measurement type indicator may be included in a measurement configuration Information Element (IE) received as part of Radio Resource Control (RRC) signaling between the UE and the eNB. In some embodiments, the measurement reporting trigger may be generated in response to an A3 event in which a difference between the measured RSRQ of the target cell and the measured RSRQ of the serving cell exceeds a predetermined A3 offset. In some embodiments, the predetermined A3 offset may be based on the measurement type indicator.

A non-transitory computer-readable storage medium that stores instructions for execution by one or more processors to perform operations for measurement reporting in a 3GPP LTE cellular network is disclosed herein. The operations may configure the one or more processors to receive, at a User Equipment (UE), signaling from an Evolved Node-B (eNB) to indicate either a first or a second Reference Signal Received Quality (RSRQ) measurement type for both a serving cell and a target cell. The operations may further configure the one or more processors to determine an RSRQ of the serving cell and an RSRQ of the target cell based on the indicated RSRQ measurement type and transmit a measurement report to the eNB based on the RSRQ of the serving cell and the RSRQ of the target cell. For the second RSRQ measurement type, the RSRQ may be determined based on an RSSI that is based on a received power of one or more Orthogonal Frequency Division Multiplexing (OFDM) symbols received at the UE. In some embodiments, for the first RSRQ measurement type, the RSRQ may be determined based on a Received Signal Strength Indicator (RSSI) over one or more received OFDM symbols in which common reference signals (CRS) are included.

In some embodiments, the signaling received from the eNB may include Radio Resource Control (RRC) signaling that includes a measurement configuration Information Element (IE) that specifies the RSRQ measurement type indicator for both the serving cell and the target cell. In some embodiments, the RSSI for the second RSRQ measurement type may include a linear average of received powers in the OFDM symbols. In some embodiments, an A3 event may occur when a difference between the determined RSRQ of the target cell and the determined RSRQ of the serving cell exceeds a predetermined A3 offset and the measurement report may be transmitted in response to an occurrence of the A3 event.

An Evolved Node-B (eNB) configured to operate in a 3GPP LTE cellular network is also disclosed herein. The eNB may comprise hardware processing circuitry configured to transmit signaling to a User Equipment (UE) to indicate either a first or a second Reference Signal Received Quality (RSRQ) measurement type for both a serving cell and a target cell. The hardware processing circuitry may be further configured to receive a measurement report from the UE that is based on the RSRQ of the serving cell and the RSRQ of the target cell. For the first RSRQ measurement type, the RSRQ for both the serving cell and the target cell may be determined from a Received Signal Strength Indicator (RSSI) over one or more Orthogonal Frequency Division Multiplexing (OFDM) symbols in which common reference signals (CRS) are included. For the second RSRQ measurement type, the RSRQ may be determined for both the serving cell and the target cell from an RSSI that is based on a received power of one or more OFDM symbols received at the UE. The hardware processing circuitry may be further configured to determine a handoff for the UE to the target cell based at least partly on the received measurement report and transmit a handoff message to the UE that indicates the handoff to the target cell. In some embodiments, the signaling may include Radio Resource Control (RRC) signaling that includes a measurement configuration Information Element (IE) that specifies the RSRQ measurement type indicator for both the serving cell and the target cell. The hardware processing circuitry may be further configured to transmit, to a target cell eNB configured to operate in the target cell, a message that indicates the RSRQ measurement type for the UE. In some embodiments, the message may be transmitted over one or more X2 interfaces.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a User Equipment (UE), the apparatus comprising: processing circuitry, configured to:

receive signaling including a Reference Signal Received Quality RSRQ-Type information element (RSRQ-Type IE) to specify a RSRQ value type for both a serving cell and a target cell;

decode the RSRQ-Type IE from the received signaling and determine, based on the RSRQ value type specified by the RSRQ-Type IE, an RSRQ value of the serving cell and an RSRQ value of the target cell, wherein for a first RSRQ value type specified by the RSRQ-Type IE, the processing circuitry is configured to determine an RSRQ value for the serving cell and an RSRQ value for the target cell from a Received Signal Strength Indicator (RSSI) measured only from Orthogonal Frequency Division Multiplexing (OFDM) symbols containing one or more reference symbols, and wherein for a second RSRQ value type specified by the RSRQ-Type IE, the processing circuitry is configured to determine an RSRQ value for the serving cell and an RSRQ value for the target cell from an RSSI measured from all OFDM symbols of a portion of a downlink transmission; and encode a measurement report for transmission to an Evolved Node-B (eNB), wherein the measurement report is based on the RSRQ value determined for the serving cell and the RSRQ value determined for the target cell; and memory, wherein the memory is configured to store the RSRQ value type specified by the RSRQ-Type IE.

2. The apparatus according to claim 1, wherein for the second RSRQ value type, the processing circuitry is configured to determine an RSRQ value from all OFDM symbols in response to decoding an RSRQ-Type IE that specifies the use of all OFDM symbols when performing RSRQ measurements.

3. The apparatus according to claim 1, wherein the RSSI for the second RSRQ value type includes a linear average of received powers in all OFDM symbols of the portion of a downlink transmission.

4. The apparatus according to claim 1, wherein:
an A3 event occurs when a difference between the determined RSRQ value of the target cell and the determined RSRQ value of the serving cell exceeds a predetermined A3 offset; and
the measurement report is encoded for transmission in response to an occurrence of the A3 event.

5. The apparatus according to claim 4, wherein the predetermined A3 offset is based at least partly on the indicated RSRQ value type.

6. The apparatus according to claim 1, wherein for the second RSRQ value type, at least one of the OFDM symbols for the determination of the RSRQ value excludes a common reference signal (CRS).

7. The apparatus according to claim 1, wherein the received signaling includes Radio Resource Control (RRC) signaling that includes a measurement configuration IE that specifies the RSRQ value type for both the serving cell and the target cell.

8. A method of measurement reporting implemented at a station (STA), the method comprising, the method comprising:
receiving signaling including a Reference Signal Received Quality RSRQ-Type information element (RSRQ-Type IE) to specify a RSRQ value type for both a serving cell and a target cell;
decoding the RSRQ-Type IE from the received signaling and determine, based on the RSRQ value type specified by the RSRQ-Type IE, an RSRQ value of the serving cell and an RSRQ value of the target cell, wherein for a first RSRQ value type specified by the RSRQ-Type IE, determining an RSRQ value for the serving cell and an RSRQ value for the target cell from a Received Signal Strength Indicator (RSSI) measured only from Orthogonal Frequency Division Multiplexing (OFDM) symbols containing one or more reference symbols, and wherein for a second RSRQ value type specified by the RSRQ-Type IE, determining an RSRQ value for the serving cell and an RSRQ value for the target cell from an RSSI measured from all OFDM symbols of a portion of a downlink transmission; and encoding a measurement report for transmission to an Evolved Node-B (eNB), wherein the measurement report is based on the RSRQ value determined for the serving cell and the RSRQ value determined for the target cell.

9. The method of claim 8, wherein for the second RSRQ value type, determining an RSRQ value from all OFDM symbols in response to decoding an RSRQ-Type IE that specifies the use of all OFDM symbols when performing RSRQ measurements.

10. The method of claim 8, wherein the RSSI for the second RSRQ value type includes a linear average of received powers in all OFDM symbols of the portion of a downlink transmission.

11. The method of claim 8, wherein an A3 event occurs when a difference between the determined RSRQ value of the target cell and the determined RSRQ value of the serving cell exceeds a predetermined A3 offset; and
the measurement report is encoded for transmission in response to an occurrence of the A3 event.

12. The method of claim 11, wherein the predetermined A3 offset is based at least partly on the indicated RSRQ value type.

13. The method of claim 8, wherein for the second RSRQ value type, at least one of the OFDM symbols for the determination of the RSRQ value excludes a common reference signal (CRS).

14. The method of claim 8, wherein the received signaling includes Radio Resource Control (RRC) signaling that includes a measurement configuration IE that specifies the RSRQ value type for both the serving cell and the target cell.

15. A computer-readable hardware storage device that stores instructions for execution by one or more processors to perform operations for measurement reporting, the operations to configure the one or more processors to:
receive signaling including a Reference Signal Received Quality RSRQ-Type information element (RSRQ-Type IE) to specify a RSRQ value type for both a serving cell and a target cell;
decode the RSRQ-Type IE from the received signaling and determine, based on the RSRQ value type specified by the RSRQ-Type IE, an RSRQ value of the serving cell and an RSRQ value of the target cell, wherein for a first RSRQ value type specified by the RSRQ-Type IE, determining an RSRQ value for the serving cell and an RSRQ value for the target cell from a Received Signal Strength Indicator (RSSI) measured only from Orthogonal Frequency Division Multiplexing (OFDM) symbols containing one or more reference symbols, and wherein for a second RSRQ value type specified by the RSRQ-Type IE, determining an RSRQ value for the serving cell and an RSRQ value for the target cell from an RSSI measured from all OFDM symbols of a portion of a downlink transmission; and encode a measurement report for transmission to an Evolved Node-B (eNB), wherein the measurement report is based on the RSRQ value determined for the serving cell and the RSRQ value determined for the target cell.

16. The computer-readable hardware storage device of claim 15, wherein the one or more processors are further configured to determine an RSRQ value from all OFDM symbols in response to decoding an RSRQ-Type IE that specifies the use of all OFDM symbols when performing RSRQ measurements.

17. The computer-readable hardware storage device of claim 15, wherein the RSSI for the second RSRQ value type includes a linear average of received powers in all OFDM symbols of the portion of a downlink transmission.

18. The computer-readable hardware storage device of claim 15, wherein an A3 event occurs when a difference between the determined RSRQ value of the target cell and the determined RSRQ value of the serving cell exceeds a predetermined A3 offset; and the measurement report is encoded for transmission in response to an occurrence of the A3 event.

19. The computer-readable hardware storage device of claim 18, wherein the predetermined A3 offset is based at least partly on the indicated RSRQ value type.

20. The computer-readable hardware storage device of claim 15, wherein for the second RSRQ value type, at least one of the OFDM symbols for the determination of the RSRQ value excludes a common reference signal (CRS).

21. The computer-readable hardware storage device of claim 15, wherein the received signaling includes Radio Resource Control (RRC) signaling that includes a measurement configuration IE that specifies the RSRQ value type for both the serving cell and the target cell.

* * * * *

UNITED STATES PATENT AND TRADEMARK OFFICE
CERTIFICATE OF CORRECTION

PATENT NO. : 10,028,184 B2  
APPLICATION NO. : 15/639547  
DATED : July 17, 2018  
INVENTOR(S) : Huang et al.

Page 1 of 1

It is certified that error appears in the above-identified patent and that said Letters Patent is hereby corrected as shown below:

On page 2, in Column 1, under "Foreign Patent Documents", Line 8, delete "WO-2017200228AI" and insert --WO-2017200226A1-- therefor On page 2, in Column 1, under "Other Publications", Lines 9-10, delete "Mar. 15, 2017"," and insert --Mar. 16, 2017",-- therefor Signed and Sealed this  
Twenty-eighth Day of May, 2019

Andrei Iancu  
*Director of the United States Patent and Trademark Office*